(12) United States Patent
Feng

(10) Patent No.: US 10,198,237 B2
(45) Date of Patent: Feb. 5, 2019

(54) DISPLAY DEVICE AND METHOD OF DRIVING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Lan Feng, Beijing (CN)

(73) Assignees: BOE TECHNOLOGY GROUP CO., LTD. (CN); BEIJING BOE DISPLAY TECHNOLOGY CO., LTD. (CN)

(*) Notice: Subject to any disclaimer, the term of this patent is extended or adjusted under 35 U.S.C. 154(b) by 0 days.

(21) Appl. No.: 15/511,649

(22) PCT Filed: Mar. 16, 2016

(86) PCT No.: PCT/CN2016/076518
§ 371 (c)(1),
(2) Date: Mar. 16, 2017

(87) PCT Pub. No.: WO2016/173331
PCT Pub. Date: Nov. 3, 2016

(65) Prior Publication Data
US 2018/0039467 A1 Feb. 8, 2018

(30) Foreign Application Priority Data
Apr. 30, 2015 (CN) .......................... 2015 1 0219932

(51) Int. Cl.
*G06F 3/147* (2006.01)
*G09G 3/3208* (2016.01)
(Continued)

(52) U.S. Cl.
CPC ............ *G06F 3/147* (2013.01); *G06F 1/1641* (2013.01); *G06F 1/1677* (2013.01); *G06F 1/3265* (2013.01); *G06F 1/3287* (2013.01); *G09G 3/001* (2013.01); *G09G 3/20* (2013.01); *G09G 3/3208* (2013.01); *G09G 3/3674* (2013.01);
(Continued)

(58) Field of Classification Search
None
See application file for complete search history.

(56) References Cited

U.S. PATENT DOCUMENTS

2007/0279315 A1 12/2007 Laves et al.
2010/0283713 A1 11/2010 Fein et al.
(Continued)

FOREIGN PATENT DOCUMENTS

CN 201876761 U 6/2011
CN 202058412 U 11/2011
(Continued)

OTHER PUBLICATIONS

First Office Action for Chinese Application No. 201510219932.X, dated Nov. 3, 2016, 5 Pages.
(Continued)

*Primary Examiner* — Nicholas Lee
(74) *Attorney, Agent, or Firm* — Brooks Kushman P.C.

(57) ABSTRACT

A display device and a method of driving the same are provided. The display device includes a drive circuit and at least two display units, the drive circuit drives one or at least two display units to display a required image.

14 Claims, 5 Drawing Sheets

(51) Int. Cl.
    *G09G 3/36*           (2006.01)
    *G06F 1/16*           (2006.01)
    *G09G 3/00*           (2006.01)
    *G09G 3/20*           (2006.01)
    *G09F 9/30*           (2006.01)

(52) U.S. Cl.
    CPC ....... *G09F 9/301* (2013.01); *G09G 2300/026* (2013.01); *G09G 2300/0421* (2013.01); *G09G 2380/02* (2013.01)

(56) References Cited

U.S. PATENT DOCUMENTS

| | | | | |
|---|---|---|---|---|
| 2014/0063392 A1* | 3/2014 | Gondo | ................. | G09G 3/3611 |
| | | | | 349/41 |
| 2014/0375530 A1* | 12/2014 | Delaporte | ............ | G06F 1/1616 |
| | | | | 345/1.3 |
| 2016/0162241 A1* | 6/2016 | An | ........................ | G06F 3/1423 |
| | | | | 345/1.3 |

FOREIGN PATENT DOCUMENTS

| | | | |
|---|---|---|---|
| CN | 102549645 A | 7/2012 |
| CN | 102723058 A | 10/2012 |
| CN | 104766545 A | 7/2015 |
| JP | H09311737 A | 12/1997 |

OTHER PUBLICATIONS

Second Office Action for Chinese Application No. 201510219932.X, dated Apr. 19, 2017, 6 Pages.
International Search Report and Written Opinion for Application No. PCT/CN2016/076518, dated Jun. 15, 2016, 14 Pages.

* cited by examiner

DISPLAY DEVICE AND METHOD OF DRIVING THE SAME

CROSS-REFERENCE TO RELATED APPLICATION

This application is the U.S. national phase of PCT Application No. PCT/CN2016/076518 filed on Mar. 16, 2016, which claims priority to Chinese Patent Application No. 201510219932.X filed on Apr. 30, 2015, the disclosures of which are incorporated in their entirety by reference herein.

TECHNICAL FIELD

The present disclosure relates to the field of display technology, in particular to a display device and a method of driving the same.

BACKGROUND

With the fast development of display-related technologies, portable devices are increasingly popular, and products combining computers and tablets have appeared on the market. However, these products have shortcomings. Even though the computers and tablets are combined to improve the usage of panels to some extent, the size of the display screens remains unchanged and thus it is impossible to prevent others from peeping into individual private content and they are not convenient to carry.

SUMMARY

The present disclosure provides a display device and a method of driving the same, so as to solve the problems in the related art that the size of the display screen of the display device is fixed and it is impossible to prevent others from peeping into individual private content.

To solve the above-mentioned technical problem, the embodiments of the present disclosure provides a display device which includes: at least two display units; and a drive circuit, connected with a part or all of the at least two display units so as to drive one display unit to display a required image or drive at least two display units to display the required image.

Optionally, in the above-mentioned display device, the display units are configured to be spaced from each other, and adjacent display units are connected to each other through at least one flexible plate to enable the display device to be folded between the adjacent display units.

Optionally, in the above-mentioned display device, the flexible plate is provided with a transmission line configured to connect corresponding signal lines of two adjacent display units.

Optionally, in the above-mentioned display device, the flexible plate is provided with a sensor configured to monitor whether the display device is folded at a position corresponding to the sensor.

Optionally, the above-mentioned display device further includes: a folding position determining circuit connected with the sensor and configured to determine a folding position when the display device is folded. The drive circuit is connected with the folding position determining circuit, and when the display device is folded, the folding position determining circuit determines the display unit for displaying the required image based on the folding position and drives the display unit to display the required image.

Optionally, in the above-mentioned display device, adjacent display units are connected to each other through at least two flexible plates.

Optionally, in the above-mentioned display device, the display units are liquid crystal display units.

Optionally, in the above-mentioned display device, the display units are organic light emitting diode display units.

Optionally, in the above-mentioned display device, the drive circuit includes a gate drive circuit and a source drive circuit. The gate drive circuit is connected with a gate line of each liquid crystal display unit and the source drive circuit is connected with a data line of each of the liquid crystal display unit; or the gate lines of adjacent liquid crystal display units are connected to each other and the data lines of adjacent liquid crystal display units are connected to each other, and the gate lines of a column of liquid crystal display units adjacent to a not-display area is connected with the gate drive circuit, and the data lines of a row of liquid crystal display units adjacent to a not-display area are connected with the source drive circuit.

Optionally, in the above-mentioned display device, the display unit includes a first substrate and a second substrate that are arranged oppositely to form a cell, base substrates of the first substrates of all the display units are independent from each other, and base substrates of the second substrates of all the display units are independent from each other.

The embodiments of the present disclosure further provide a method of driving the above-mentioned display device. The display device includes at least two display units. The method includes: driving one of the at least two display units to display a required image or driving at least two display units to display the required image.

Optionally, the above-mentioned method specifically includes: monitoring whether the display device is folded; determining a folding position in response to determining the display device is folded; and determining a display unit for displaying the required based on the folding position, and driving the display unit to display the required image.

Optionally, in the above-mentioned method, monitoring whether the display device is folded includes: sensing a bending angle of a flexible plate using a sensor and determining whether the display device is folded at a position corresponding to the sensor.

Optionally, in the above-mentioned method, the sensor is numbered and a folding signal including the number information is transmitted to a folding position determining circuit, and the folding position determining circuit determines a folding position based on the folding signal.

Optionally, in the above-mentioned method, the folding signal further includes folding direction information.

Optionally, the above-mentioned method includes: driving one or at least two display units to display the required image and controlling other display units to display in a dark state.

The present disclosure has the following beneficial effects:

In the above-mentioned the technical solutions, the display device includes at least two display units, and one display unit or at least two display units are driven to display the required image, thereby achieving the adjusting of the size of the display screen and preventing others from peeping into individual private content by means of smaller display screen.

BRIEF DESCRIPTION OF THE DRAWINGS

In order to more clearly illustrate the embodiments of the present disclosure or the technical solutions in the related art, drawings which are required to be used in the description of the embodiments or related art will be briefly described below. Apparently, the drawings in the following description relate to only some embodiments of the present disclosure. It will be apparent to a person of ordinary skills in the art that other drawings may be derived from the drawings without any creative work.

DETAILED DESCRIPTION

Figure 1:
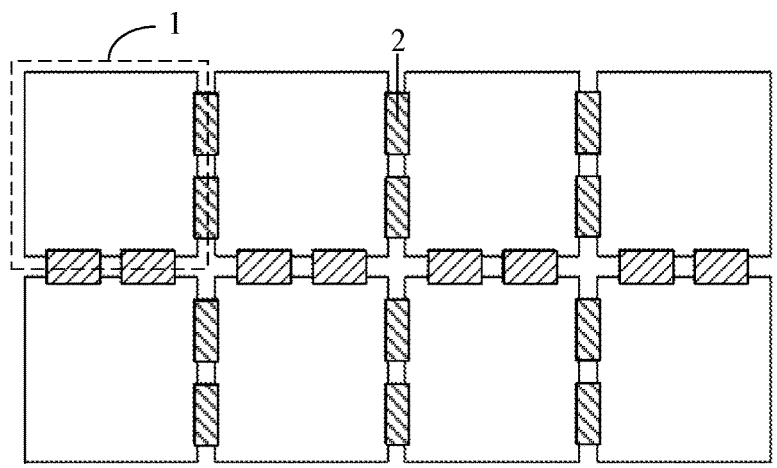
FIG. 1 illustrates a schematic diagram of a display device according to at least one embodiment of the present disclosure.

Unless otherwise defined, technical or scientific terms used herein shall have the ordinary meanings as understood by a person of ordinary skills in the art to which the present disclosure pertains. The words "first," "second," and the like as used in the specification and claims of the present disclosure do not denote any order, amount or importance, but are merely used to distinguish different constituent parts. Similarly, the words "a" or "an" and the like are merely used to represent the existence of at least one member, rather than to limit the number thereof. The words "connect" or "connected" and the like are not limited to physical or mechanical connections, but may include electrical connections, whether direct or indirect. The words "on," "under," "left" and "right" and the like are merely used to indicate relative position relationships, and when an absolute position of the described object changes, the relative position relationships changes accordingly.

The present disclosure provides a display device in which a display screen is adjustable in size. The display device includes a drive circuit and at least two display units. The drive circuit is connected with a part or all of the at least two display units so as to drive one display unit to display a required image or drive at least two display units to display the required image. Therefore, the adjusting of the size of the display screen can be achieved and a smaller display screen may prevent others from peeping into individual private content.

The at least two display units may be combined into a rectangle or square display screen for displaying images better.

The display device may be a liquid crystal display device, an organic light emitting diode display device, a plasma display device, etc.

A signal line of each display unit may be separately connected with the drive circuit, or the signal lines of adjacent display units may be connected correspondingly and the signal line(s) of a part of the display units may be configured to be connected with the drive circuit, thereby simplifying the arrangement of the signal lines of the display device. Taking the thin film transistor liquid crystal display device as an example, the drive circuit includes a gate drive circuit and a source drive circuit. The gate lines and the date lines of the liquid crystal display units are arranged in rows and columns and cross each other. The gate line of each of the liquid crystal display units may be connected with the gate drive circuit and the data line thereof may be connected with the source drive circuit, or the gate lines of adjacent liquid crystal display units are connected to each other, and the data lines thereof are connected to each other, and only the gate lines of a column of liquid crystal display units which are adjacent to a not-display area are connected with the gate drive circuit, and only the data lines of a row of liquid crystal display units which are adjacent to the not-display area are connected with the source drive circuit.

The present disclosure will be specifically described in conjunction with accompanying drawings and embodiments. The following embodiments are merely illustrative of the present disclosure and are not intended to limit the scope of the present disclosure.

Figure 2:
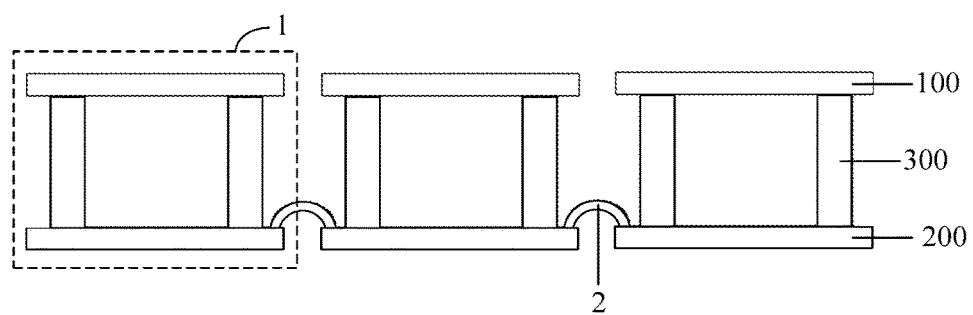
FIG. 2 illustrates a cross-sectional view of FIG. 1.

As shown in FIGS. 1 and 2, the display device of the embodiments of the present disclosure includes a drive circuit and at least two display units 1. The drive circuit is connected with a part or all of the at least two display units 1 so as to drive one display unit 1 to display a required image or drive at least two display units 1 to display the required image, thereby achieving the adjusting of the size of the display screen of the display device.

Optionally, a user instruction dialog box may be provided for inputting a user instruction to select the display unit 1 for displaying, and the drive circuit drives the corresponding display unit 1 to display the required image based on the user instruction.

Optionally, the display units 1 of the display device are configured independently of each other, each of the display units 1 may display an image independently or in combination with other display units 1.

For a liquid crystal display device, as shown in FIG. 2, the display unit 1 includes a first substrate 100 and a second substrate 200 arranged oppositely to form a cell. The first substrate 100 may be one of an array substrate and a color filter substrate, and the second substrate 200 may be the remaining one of the array substrate and the color filter substrate. A sealed space is formed by sealant 300 between the array substrate and the color filter substrate and is filled with liquid crystal molecules.

Accordingly, the display units 1 of the display device of the present disclosure are display panels.

In the embodiments of the present disclosure, the first substrates 100 of all the display units 1 share one base substrate, and/or, the second substrates 200 of all the display units 1 share one base substrate.

For the liquid crystal display device, for the convenience of instilling liquid crystal molecules, the first substrates 100 of all the display units 1 are configured to share one base substrate, and the base substrates of the second substrates 200 are independent from each other, or the second substrates 200 of all the display units 1 share one base substrate and the base substrates of the first substrates 100 are independent from each other.

Accordingly, the method of driving the display device according to the embodiments of the present disclosure includes: driving one display unit 1 to display the required image or driving at least two display units 1 to display the required image.

To reduce power consumption, the method of driving the display device further includes: when one or at least two display units 1 are driven to display the required image, other display units 1 are controlled to display in a dark state.

Optionally, the display units 1 may be configured to always display in the dark state, i.e. the display units 1 display in the dark state when there is no driving signal.

According to the technical solutions of the present disclosure, the display device is configured to include at least two separate display units 1, and one display unit 1 or at least two display units 1 are driven to display the required image, thereby achieving the adjusting of the size of the display screen and preventing others from peeping into individual private content by means of smaller display screen.

Optionally, the display units 1 of the display device are configured to be spaced from each other, and adjacent display units 1 are connected through at least one flexible plate 2 so that the display device may be folded between the adjacent display units 1 and is convenient to carry.

In practice, the display units 1 of the display device are usually configured to be spaced from each other in a matrix fashion, e.g. the 2*4 matrix as shown in FIG. 1, and the display device is folded by folding adjacent display units 1, such as by folding two adjacent rows of or two adjacent columns of display units, as shown in FIGS. 3-9. As can be known from the figures, the display device may be folded once or successively folded, even may be folded to have one display unit 1 for displaying.

Figure 3:
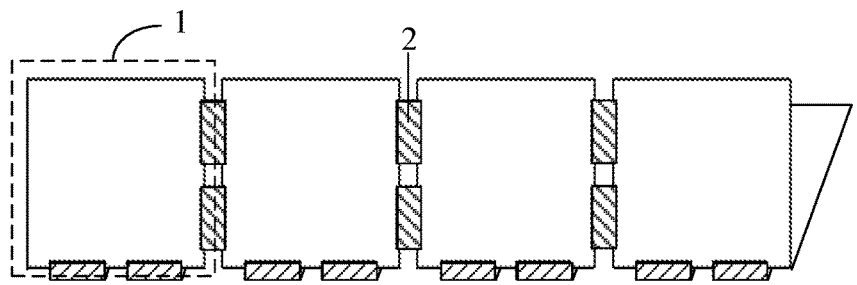
FIGS. 3-9 illustrate schematic diagrams of a folded display device according to at least one embodiment of the present disclosure.
Figure 4:
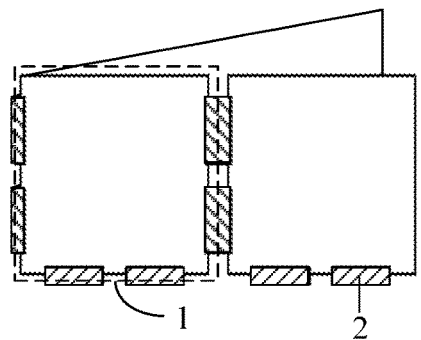
Figure 5:
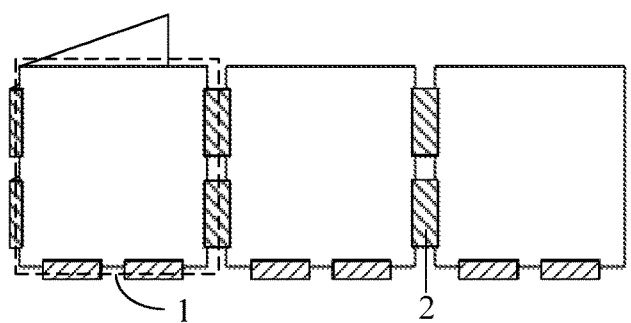
Figure 6:
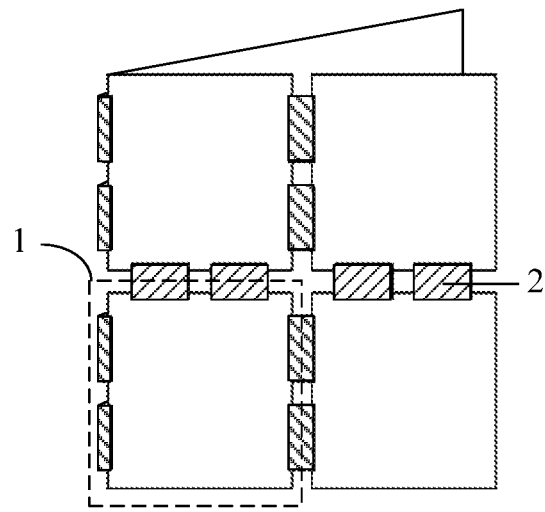
Figure 7:
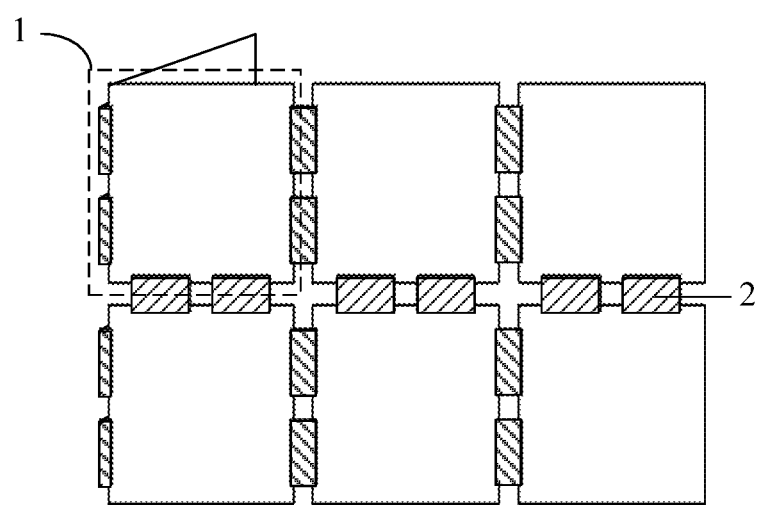
Figure 8:
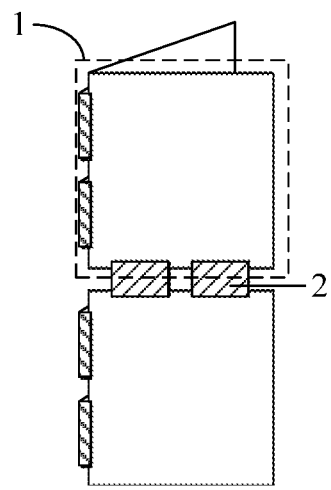
Figure 9:
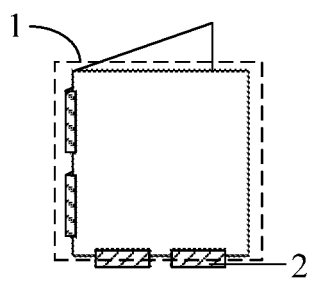

It should be noted that configuring the display units 1 to be spaced from each other means: the base substrates of the first substrates 100 of all the display units 1 are independent from each other, and the base substrates of the second substrates 200 of all the display units 1 are independent from each other. Folding the adjacent display units 1 includes the angle between the adjacent display units 1 being greater than 0° and less than 180°, or being equal to 0°, and when the angle between the adjacent display units 1 is equal to 0°, the display device may be further folded, e.g. as shown in FIGS. 3 and 4.

To ensure the smoothness of the display screen, adjacent display units 1 may be configured to be connected through at least two flexible plates 2.

Figure 10:
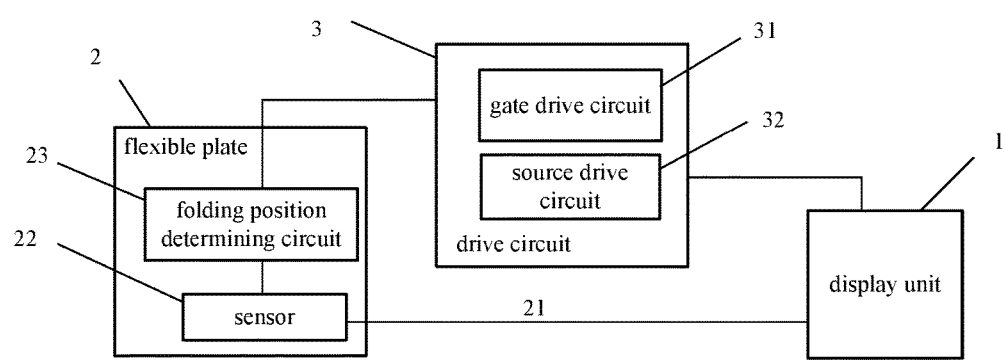
FIG. 10 illustrates another schematic diagram of a display device according to at least one embodiment of the present disclosure.

Further, as shown in FIG. 10, transmission lines 21 may be provided on the flexible plates 2, and the transmission lines 21 are used to connect corresponding signal lines of the two adjacent display units 1. In this way, only the signal lines of a part of the display units 1 are configured to be connected with the drive circuit so as to allow all the display units 1 to receive display signals provided by the drive circuit, thereby simplifying the arrangement of the signal lines of the display device. For example, for the thin film transistor liquid crystal display device, the drive circuit 3 includes a gate drive circuit 31 and a source drive circuit 32, the gate lines and the data lines of the display units 1 are distributed in rows and columns and cross each other, first transmission lines for connecting gate lines of adjacent display units 1 are provided on the flexible plates 2 between the display units 1 in the same row, and second transmission lines for connecting data lines of adjacent display units 1 are provided on the flexible plates 2 between the display units 1 in the same column, therefore only the gate lines of a column of display units 1 which are adjacent to the not-display area are configured to be connected with the gate drive circuit and only the data lines of a row of display units 1 which are adjacent to the not-display area are configured to be connected with the source drive circuit so that all the display units 1 may receive gate scanning signals and pixel voltage signals.

Further, the display unit 1 used for displaying may be automatically determined by folding the display device. Specifically, a sensor 22 which is used for monitoring whether the portion corresponding to the sensor are folded may be provided on the flexible plate 2 between adjacent display units 1. A folding position determining circuit 23 which is connected with the sensor may be provided, and determines the folding position when the display device is folded. The drive circuit of the display device is connected with the folding position determining circuit, and when the display device is folded, the folding position determining circuit automatically determines the display unit to display images based on the folding position and drives the corresponding display unit to display the required image.

Accordingly, the method of driving the display device according to the embodiments of the present disclosure specifically includes: monitoring whether the display device is folded; determining a folding position in response to determining the display device is folded; determining a display unit for displaying an image based on the folding position, and driving the display unit to display the required image.

The above-mentioned method can automatically determine folding position the display unit for displaying based on the folding position, and drives the corresponding display unit to display the required image, thereby effectively combining the folding of the display device and the adjusting of the size of the display screen. Therefore, the foldable display device is convenient to carry and may adjust the size of the display screen to achieve personalized display effects. When the size of the display screen becomes smaller when the display screen is folded, it is possible to prevent others from peeping into individual private content.

Since the sensors used for monitoring whether the display device is folded is provided on the flexible plate 2, it is possible to determine whether the corresponding position is folded by sensing the bending angle of the flexible plate 2. The sensors may be numbered and the folding signal transmitted by the sensors to the folding position determining circuit includes corresponding number information, and the folding position determining circuit may determine the folding position based on the combination of the numbers.

Further, the folding signal may be configured to include folding direction information and the drive circuit determines based on the folding position and folding direction which part of the display units 1 is used for displaying after the display device is folded and drives the corresponding display units 1 to display the required image. For example, as shown in FIGS. 1 and 3, the display units 1 at the lower part of the display device are folded downwards, and the display units 1 at the upper part are determined to be used for displaying.

In practice, a user instruction dialog box may be provided for inputting a user instruction to select the display units for displaying, and the drive circuit drives the corresponding display units to display the required image based on the user instruction, and then the display device is folded to orient the display units 1 for displaying towards the user.

In an embodiment, the display units 1 of the display device are configured to be spaced from each other, and adjacent display units 1 are connected through at least two flexible plates 2 so that the smoothness of the display screen may be ensured and the display device may be folded between the adjacent display units 1. Transmission lines 21 may be provided on the flexible plates 2, and the transmission lines are used to connect corresponding signal lines of two adjacent display units 1, thereby eliminating the need of connecting the signal lines of each of the display units 1 to the drive circuit and simplifying the arrangement of the signal lines of the display device. In this embodiment, only the signal lines of a part of the display units 1 are connected with the drive circuit to allow all the display units 1 to receive the display signal provided by the drive circuit, thereby simplifying the arrangement of the signal lines of the display device.

In another embodiment, the display units 1 of the display device are configured to be spaced from each other, and adjacent display units 1 are connected through at least two flexible plates 2 so that the smoothness of the display screen may be ensured and the display device may be folded between the adjacent display units 1. A sensor 22 which is used for monitoring whether the portion corresponding to the sensor are folded may be provided on the flexible plate 2 between adjacent display units 1. A folding position determining circuit 23 which is connected with the sensor may be provided, and determines the folding position when the display device is folded. The drive circuit of the display device is connected with the folding position determining circuit, and when the display device is folded, the folding position determining circuit automatically determines the display unit to display images based on the folding position and drives the corresponding display unit to display the required image. In this embodiment, the folding of the display device and the adjusting of the size of the display screen are effectively combined so that the foldable display device is convenient to carry and can adjust the size of the display screen to achieve personalized display effects. When the size of the display screen becomes smaller when the display screen is folded, it is possible to prevent others from peeping into individual private content.

In the embodiments of the present disclosure, the display device specifically includes: at least two display units 1 configured to be spaced from each other; a drive circuit 3 connected with a part or all of the at least two display units 1 so as to drive one display unit 1 to display a required image or drive at least two display units 1 to display the required image; a flexible plate 2 configured to connect adjacent display units 1 which may be connected through at least two flexible plates 2; a transmission line 21, provided on the flexible plate 2 and configured to connect corresponding signal lines of adjacent display units 1; a sensor 22, provided on the flexible plate 2 and configured to sense a bending angle of the flexible plate 2 and monitor whether the corresponding portion is folded and transmit a folding signal which includes a number of the corresponding sensor and a folding direction to a folding position determining circuit 23; the folding position determining circuit 23 which is connected with the sensor, and configured to determine the folding position based on the number of the sensor in the folding signal when the display device is folded; a drive circuit connected with the folding position determining circuit, and configured to automatically determine the display unit 1 to display an image based on the folding position and the folding direction and drive the corresponding display unit 1 to display the required image.

In the embodiments of the present disclosure, the display device may be any product or component having a display function such as an electronic paper, a mobile phone, a tablet computer, a television set, a display, a notebook computer, a digital photo frame and a navigator.

According to the technical solutions of the present disclosure, the display device includes a drive circuit and at least two display units, and the drive circuit drives one display unit 1 or at least two display units 1 to display the required image, thereby achieving the adjusting of the size of the display screen and preventing others from peeping into individual private content by means of smaller display screen.

The above-mentioned embodiments are merely optional embodiments of the present disclosure. It should be noted that improvements and modifications may be made by those skilled in the art without departing from the technical principles of the present disclosure. These improvements and modifications should also be considered within the scope of protection of the present disclosure.

What is claimed is:

1. A display device, comprising:
   at least two display units; and
   a drive circuit, connected with a part or all of the at least two display units so as to drive one display unit to display a required image or drive at least two display units to display the required image,
   wherein the display units are configured to be spaced from each other, and adjacent display units are connected to each other through at least one flexible plate to enable the display device to be folded between the adjacent display units, and
   wherein the display unit comprises a first substrate and a second substrate that are arranged oppositely to form a cell, base substrates of the first substrates of all the display units are independent from each other, and base substrates of the second substrates of all the display units are independent from each other.

2. The display device according to claim 1, wherein the flexible plate is provided with a transmission line configured to connect corresponding signal lines of two adjacent display units.

3. The display device according to claim 1, wherein the flexible plate is provided with a sensor configured to monitor whether the display device is folded at a position corresponding to the sensor.

4. The display device according to claim 1, wherein adjacent display units are connected to each other through at least two flexible plates.

5. The display device according to claim 1, wherein the display units are liquid crystal display units.

6. The display device according to claim 1, wherein the display units are organic light emitting diode display units.

7. The display device according to claim 1, wherein the drive circuit comprises a gate drive circuit and a source drive circuit,
   the gate drive circuit is connected with a gate line of each liquid crystal display unit and the source drive circuit is connected with a data line of each liquid crystal display unit; or
   the gate lines of adjacent liquid crystal display units are connected to each other and the data lines of adjacent liquid crystal display units are connected to each other, and the gate lines of a column of liquid crystal display units adjacent to a not-display area is connected with the gate drive circuit, and the data lines of a row of liquid crystal display units adjacent to a not-display area are connected with the source drive circuit.

8. A method of driving a display device, wherein the display device comprises at least two display units, the method comprises:
   driving one of the at least two display units to display a required image or driving at least two display units to display the required image,
   wherein the display units are configured to be spaced from each other, and adjacent display units are connected to each other through at least one flexible plate to enable the display device to be folded between the adjacent display units, and
   wherein the display unit comprises a first substrate and a second substrate that are arranged oppositely to form a cell, base substrates of the first substrates of all the display units are independent from each other, and base substrates of the second substrates of all the display units are independent from each other.

9. The method according to claim 8, wherein the method specifically comprises:
monitoring whether the display device is folded;
determining a folding position in response to determining the display device is folded; and
determining a display unit for displaying the required based on the folding position, and driving the display unit to display the required image.

10. The method according to claim 9, wherein the monitoring whether the display device is folded comprises: sensing a bending angle of a flexible plate using a sensor and determining whether the display device is folded at a position corresponding to the sensor.

11. The method according to claim 8, comprising driving one or at least two display units to display the required image and controlling other display units to display in a dark state.

12. The method according to claim 9, comprising driving one or at least two display units to display the required image and controlling other display units to display in a dark state.

13. The method according to claim 10, comprising driving one or at least two display units to display the required image and controlling other display units to display in a dark state.

14. A display device, comprising:
at least two display units; and
a drive circuit, connected with a part or all of the at least two display units so as to drive one display unit to display a required image or drive at least two display units to display the required image,
wherein the drive circuit comprises a gate drive circuit and a source drive circuit, the gate lines of adjacent liquid crystal display units are connected to each other and the data lines of adjacent liquid crystal display units are connected to each other, and the gate lines of a column of liquid crystal display units adjacent to a not-display area is connected with the gate drive circuit, and the data lines of a row of liquid crystal display units adjacent to a not-display area are connected with the source drive circuit.

* * * * *